United States Patent
Blanch et al.

(10) Patent No.: US 6,691,036 B2
(45) Date of Patent: *Feb. 10, 2004

(54) PROCESSING FOR SONIC WAVEFORMS

(75) Inventors: Joakim O. Blanch, Houston, TX (US); Sven G. Holmquist, Houston, TX (US); Jennifer A. Market, Spring, TX (US); Georgios L. Varsamis, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/243,471

(22) Filed: Sep. 13, 2002

(65) Prior Publication Data

US 2003/0018433 A1 Jan. 23, 2003

Related U.S. Application Data

(63) Continuation of application No. 09/547,304, filed on Apr. 11, 2000, now Pat. No. 6,453,240.
(60) Provisional application No. 60/128,912, filed on Apr. 12, 1999.

(51) Int. Cl.$^7$ ................................. G01R 1/48
(52) U.S. Cl. ........................................ 702/11
(58) Field of Search ................... 702/6, 11, 12, 702/13, 14, 17; 367/32, 73

(56) References Cited

U.S. PATENT DOCUMENTS 5,278,805 A * 1/1994 Kimball ...................... 367/32
5,594,706 A * 1/1997 Shenoy et al. ................. 702/6

* cited by examiner

*Primary Examiner*—Donald E. McElheny, Jr.
(74) *Attorney, Agent, or Firm*—Conley Rose, P.C.

(57) ABSTRACT

A method for creating a frequency domain semblance for use in conjunction with acoustic logging tools is disclosed. Such a frequency domain semblance may be obtained by transforming an acoustic signal received at multiple depths into the frequency domain, combining the received waveforms corresponding to the different depth, and expressing the result in a graph with slowness and frequency axes. This graph shows the frequency-slowness location for the acoustic signal, as well as for other related signals that may inadvertently be generated by the acoustic logging tool. This information may then be used to more clearly measure the slowness of the received acoustic signal. Another aspect of the invention is the treatment of two or more time domain semblances as probability density functions of the slowness for an acoustic signal. This enables the combination of time domain semblances from the same depth in the wellbore.

18 Claims, 21 Drawing Sheets

PROCESSING FOR SONIC WAVEFORMS

CROSS-REFERENCE TO RELATED APPLICATIONS

This is a continuation application of U.S. application Ser. No. 09/547,304 filed Apr. 11. 2000, U.S. Pat. No. 6,453,240, and further relates to provisional Application Serial No. 60/128,912 filed Apr. 12, 1999.

STATEMENT REGARDING FEDERALLY SPONSORED RESEARCH OR DEVELOPMENT

Not Applicable.

BACKGROUND OF THE INVENTION

To determine whether a particular rock formation contains oil or other hydrocarbons, it must have certain properties. Acoustic tools, also known as sonic tools, are one way to investigate a rock formation around a wellbore.

As shown in FIG. 1, an acoustic tool 100 may be part of a bottomhole assembly in a drill string 110 drilling through a rock formation 120. Alternately, such an acoustic tool may be part of a wireline device. The acoustic tool may include an acoustic transmitter 130 and a set of acoustic receivers 140, 145. When the acoustic tool is placed in the wellbore drilled through a rock formation, the tool 100 transmits a signal 150 from its transmitter 130. This signal travels through the rock formation 120 and arrives at the receivers 140, 145. The signal is detected at the set of receivers as a series of waveforms 155 as generally shown in FIG. 2A. One parameter of particular interest is an acoustic signal's speed through the surrounding formation. Speed can also be expressed as slowness, the inverse of speed. Such information is then used to infer whether hydrocarbons are present in the rock formation around the wellbore. As shown in FIG. 2A, a set of seven receivers generates seven different detected waveforms or "channels." Based on the time delay of the waveforms or channels, the slowness of the signal through the rock formation and other characteristics of the rock formation can be determined.

The data from acoustic tools may be placed on a graph for simplified interpretation. One known method to analyze the waveforms is a time domain semblance as shown in FIG. 2B. The time domain semblance for a set of waveforms is obtained by stacking the waveforms or channels through a range of slowness values. A range of semblance values are then assigned to the stacked waveforms, with a higher semblance value corresponding to a higher degree of "fit" among all the waveforms.

This resulting time domain semblance is often a color-coded "map" drawn on a time axis and a slowness axis. The locations of "peaks" on the map, shown by high semblance values, indicate the estimate of the slowness (the inverse of velocity) of the received signal from the transmitter and the time of arrival for the signal at the last receiver (although any receiver could be chosen to correlate with the time axis). For example, a low semblance value may be represented by a blue color, a medium semblance value may be represented by a yellow color, and a high semblance value may be represented by a red color.

Complicating this analysis is that after being generated by the acoustic transmitter, and depending upon the frequency of the acoustic signal and the characteristics of a rock formation, an acoustic signal from the transmitter may excite a variety of types of secondary acoustic waves. These types of secondary acoustic waves include compressional waves, shear waves, and Stonley waves. Each of these may then be indicated by a different peak on the time domain semblance. In addition to showing the location of received waves on the semblance, the time domain semblance gives an indication of the intensity of the received wave and a "shape" corresponding to each received wave. Multiple time domain semblances are then be used to create a log or other correlation between depth and slowness.

However, semblance graphs have numerous drawbacks, including the presence of aliases, also known as shadows, on the slowness/time semblance graph. These aliases or shadows are spots or peaks on the semblance graph that indicate that a wave was received at the acoustic receivers, but in reality these peaks are phantom "shadows" that exist simply because of problems in the derivation of the semblance graph. This creates uncertainty regarding the analysis of the traveling wave, and can therefore lead to errors in the analysis of the formation.

In addition, a "smeared" or spread out peak on the semblance graph can also arise from unusually high dispersion of the acoustic signal in a rock formation, such as happens in a very soft rock formation. Similar smearing or diffusion of a peak can result from problems with the acoustic tool. Thus, the time domain semblance has difficulty distinguishing between an improperly operating tool and a rock formation that disperses acoustic waves to an unusually high degree.

Further, smearing and other spread-out peaks are a problem because of the difficulty of finding the "true" location of a wave's slowness. Thus, the smearing of a peak decreases the accuracy of the measurements and increases the chances that a mistake will be made. A solution is needed that reduces or solves these problems.

Another problem in acoustic logging is the enormous amount of data that must be collected while the tool is downhole. Memory carried within the acoustic tool is expensive and should not be wasted storing unnecessary data. Thus, downhole compression of the waveform data is necessary. Nonetheless, even more efficient compression of the data is desired to further conserve downhole memory.

Yet another problem in logging is to compute the slowness of different types of waves at various depths in the wellbore. One attempted solution to this problem is to store waveform data downhole and analyze the data at the surface. However, the analysis of the data at the surface to find peaks in semblance and other characteristics of the received waves is very slow and wasted time in the field is expensive. This solution is therefore undesirable. Another approach to this problem is to program a downhole processor to identify waves and their slowness downhole. However, while this approach substantially speeds the analysis (by utilizing "dead time" between consecutive acquisitions) it is inaccurate because of the complexities in analyzing wellbore data. Thus, a better solution is required. Ideally, this solution would combine the efficiency of performing some processing downhole with the accuracy of the surface analysis.

DETAILED DESCRIPTION OF THE PREFERRED EMBODIMENT

One aspect of the invention is a novel approach to interpret time domain semblance graphs. In particular, the invention interprets semblance graphs as probability density functions (layouts). This allows a series of semblance graphs to be combined to yield a more accurate estimate of waveform slowness and other characteristics of the rock formation around the wellbore.

Figure 3:
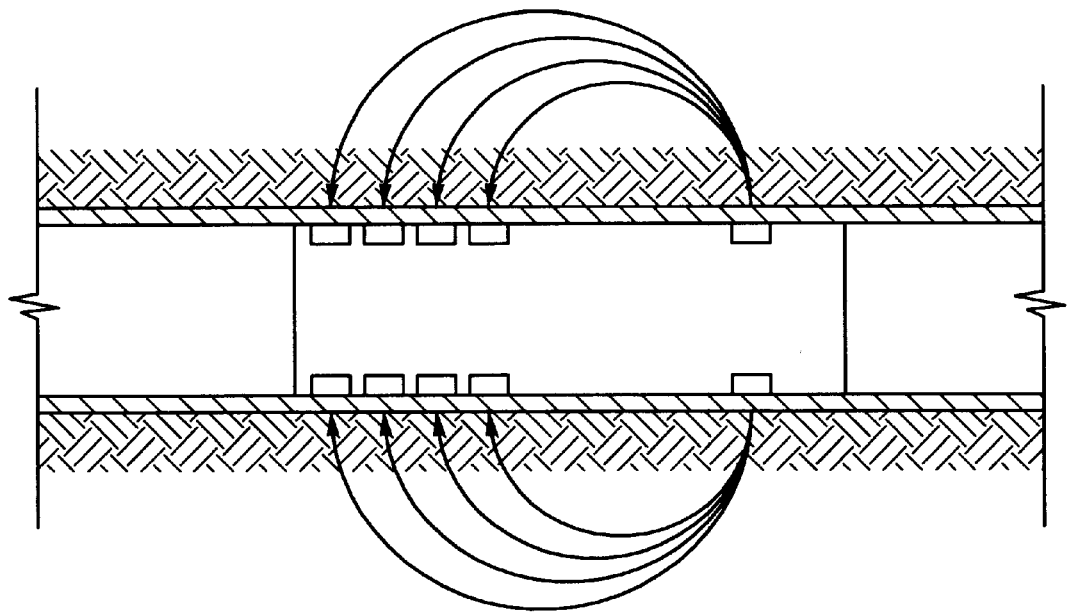
FIG. 3 is a novel acoustic tool including more than one set of acoustic receivers spaced around the circumference of the tool.
Figure 1:
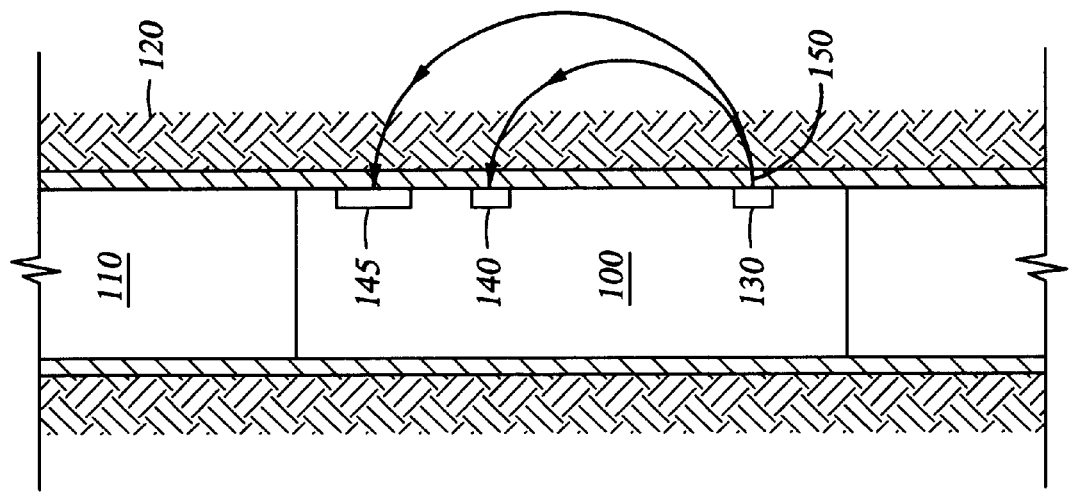
FIG. 1 is a side view of a prior art acoustic tool in a wellbore.

Inaccuracy and smearing of a peak on a semblance graph may occur because an acoustic tool is not centered in the wellbore. The invention solves this problem first by a novel sonic tool design. Referring to FIG. 3, it can be seen that a sonic tool according to this aspect of the invention includes more than one set of acoustic receivers spaced around the sides of the acoustic tool. Multiple acoustic transmitters may also be spaced evenly around the outer perimeter of the tool. The two or more transmitters would then be fired at the same time. This results in more than one semblance graph for the same depth. Alternately, acoustic data for the same depth could be obtained by other methods or devices.

By interpreting semblance graphs for the same depth as not only broad indications of time and slowness, but instead as probability density functions, two or more graphs may be combined more effectively to result in a more accurate estimate of the wave slowness and time at a particular depth. For example, one semblance graph from a particular depth may have a more spread-out peak for a particular slowness and time, while the additional semblance graph from that depth may have a more concentrated peak corresponding to that formation. To estimate most closely the actual slowness and time for the formation, the two graphs should be treated as a density function that weights the peaks as probabilities: The semblance surfaces (i.e. array of semblance values) corresponding to the same depth are then multiplied together to form a maximum likelihood estimate of the slowness of the formation. For example, the semblance value at a particular slowness and time from one acoustic signal will be multiplied with the semblance value at the same slowness and time from a second acoustic signal (and a third, etc). The slowness corresponding to the peak value of the maximum likelihood estimate is used as the estimated slowness for the formation. Thus, if one of the measurements has a higher semblance value for a certain slowness, this slowness value results in being given a greater weight in the final combination of the values. A diffuse or spread out peak is considered less well determined, will commonly have a lower semblance value and ultimately has less impact or weighting in the final combination. Other forms of maximum likelihood estimates (other than straight multiplication) can be utilized as well. Of course, it would be understood by one of ordinary skill upon reading this disclosure that calculations may be performed directly on the array of semblance data without any need to first construct a color-coded graph.

Another aspect of the invention is the creation of a frequency domain semblance. Just as a time domain semblance is a time-slowness graph portraying a waveform's slowness through a particular formation, the frequency domain sequence is a frequency-slowness graph that depicts that waveform's slowness. Like the time domain semblance, a frequency domain semblance may be color coded, with blue colors represented low semblance values, yellow colors representing medium semblance values, and red colors representing high semblance values. Such a frequency domain semblance can be used either on its own to determine the characteristics of a rock formation, or can be used in conjunction with a time domain semblance to increase the accuracy and reliability of measurements regarding the rock formation.

Figure 2A:
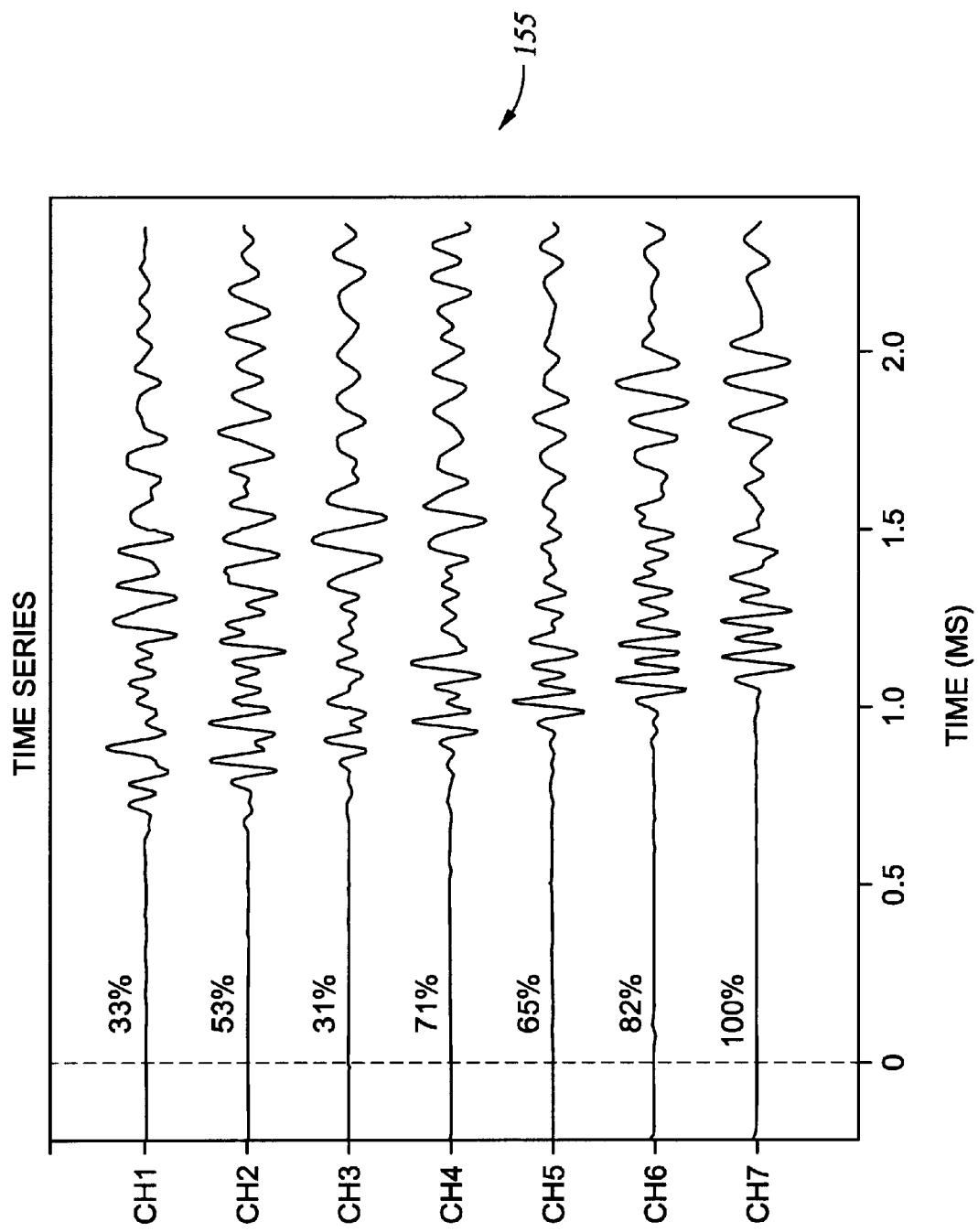
FIG. 2A is a set of waveform time series showing the reception of a traveling waveform at a spaced set of receivers.

Referring generally to FIG. 2A, a series of waveforms arrive at a set of receivers, for example, seven. As can be seen, the acoustic signal arrives initially at the closest receiver (channel 1 for the example) and last at the receiver furthest away from the transmitter (channel 7 for the example).

Figure 2B:
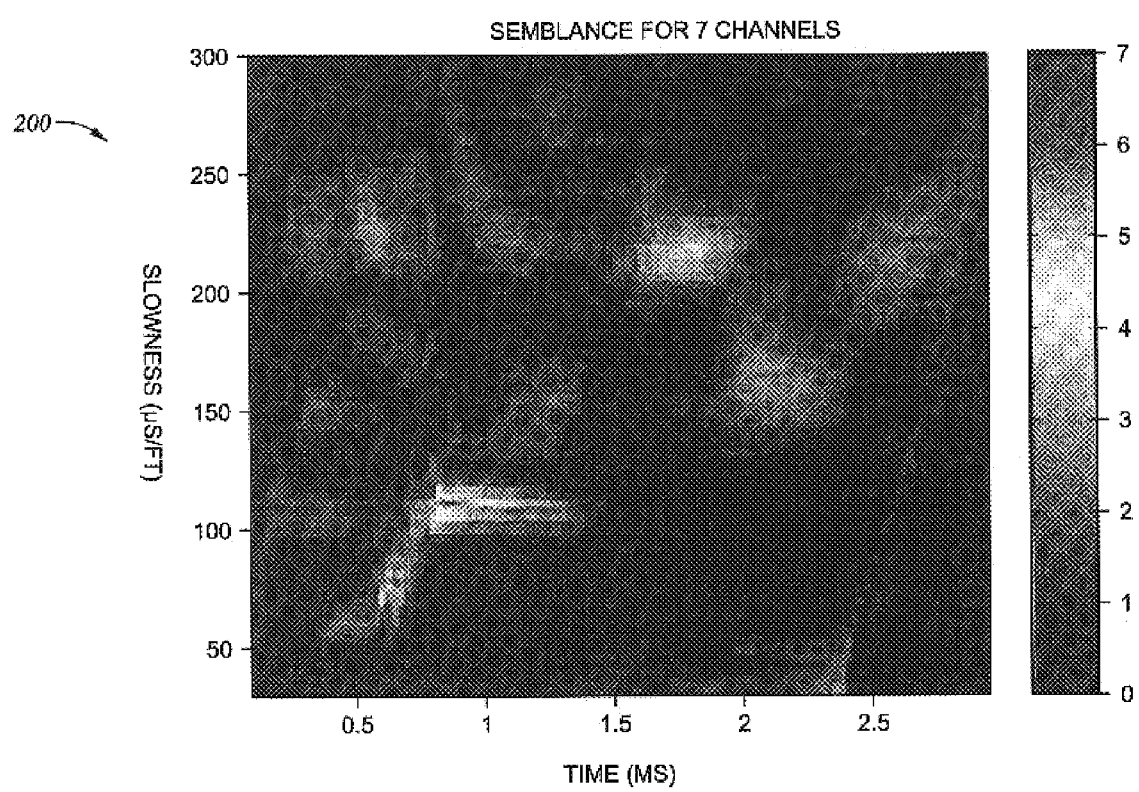
FIG. 2B is a time domain semblance of the waveforms of FIG. 2A.
Figure 2C:
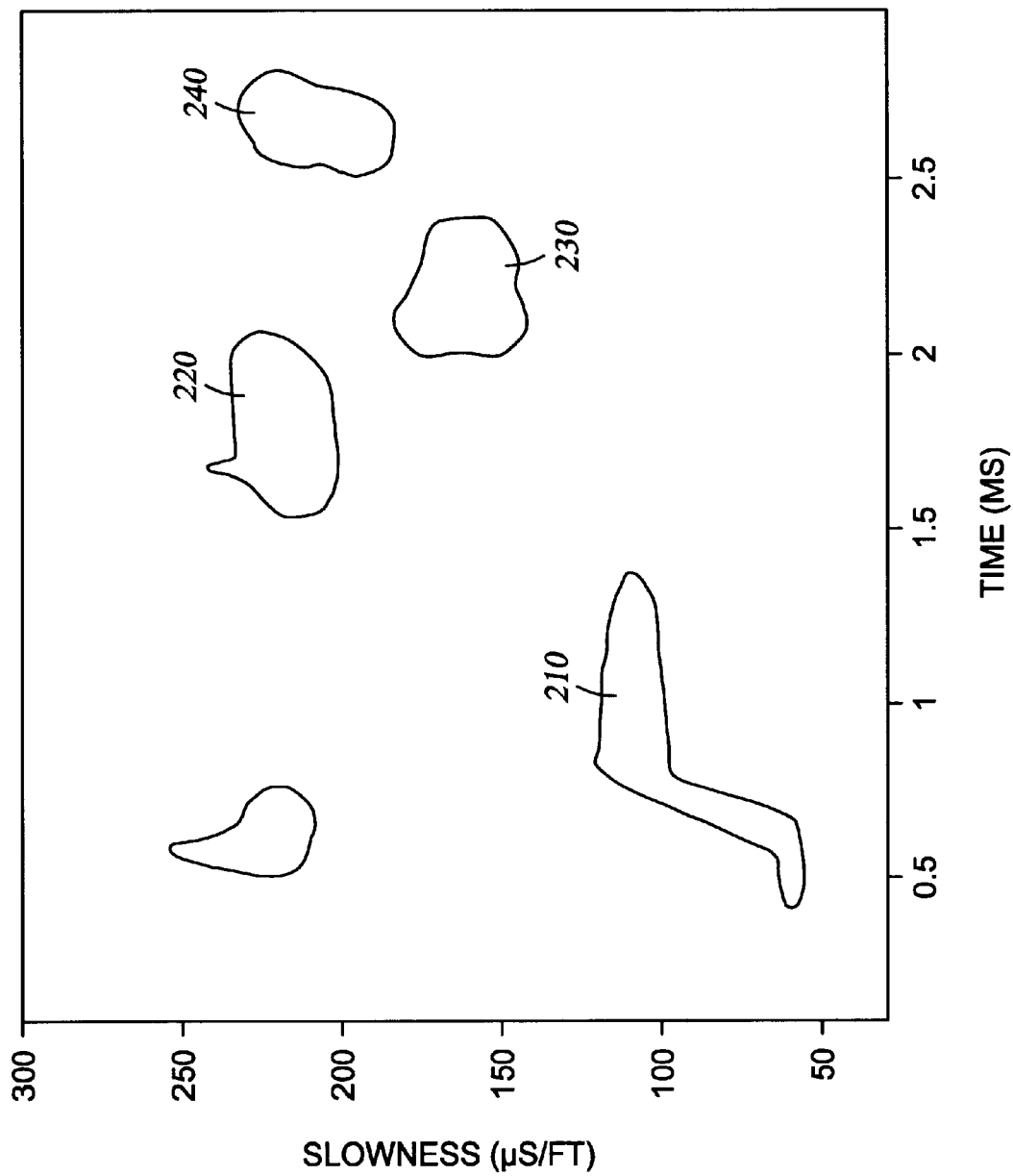
FIG. 2C is an outline view of FIG. 2B

A typical time domain semblance 200 for these waveforms is shown in FIG. 2B. FIG. 2C is a traced outline of the semblance shown in FIG. 2B; including labeled peaks 210, 220, 230, 240. In both FIGS. 2B and 2C, a peak 210 of relatively high intensity or semblance value exists somewhere around 100 microseconds/ft, with another peak 220 at about 225 microseconds/ft. It can be seen by reference to FIGS. 2B and 2C that some uncertainty exists on the semblance graph as to the arrival time and speed of the received signal. In addition, a question exists as to how to interpret what type of wave each peak represents and whether a particular peak is simply a shadow or alias of some other peak. Until now, the best way to determine what each peak represents was through either an experienced eye or by use of a peak-picking software program, which may be subject to error.

Figure 2D:
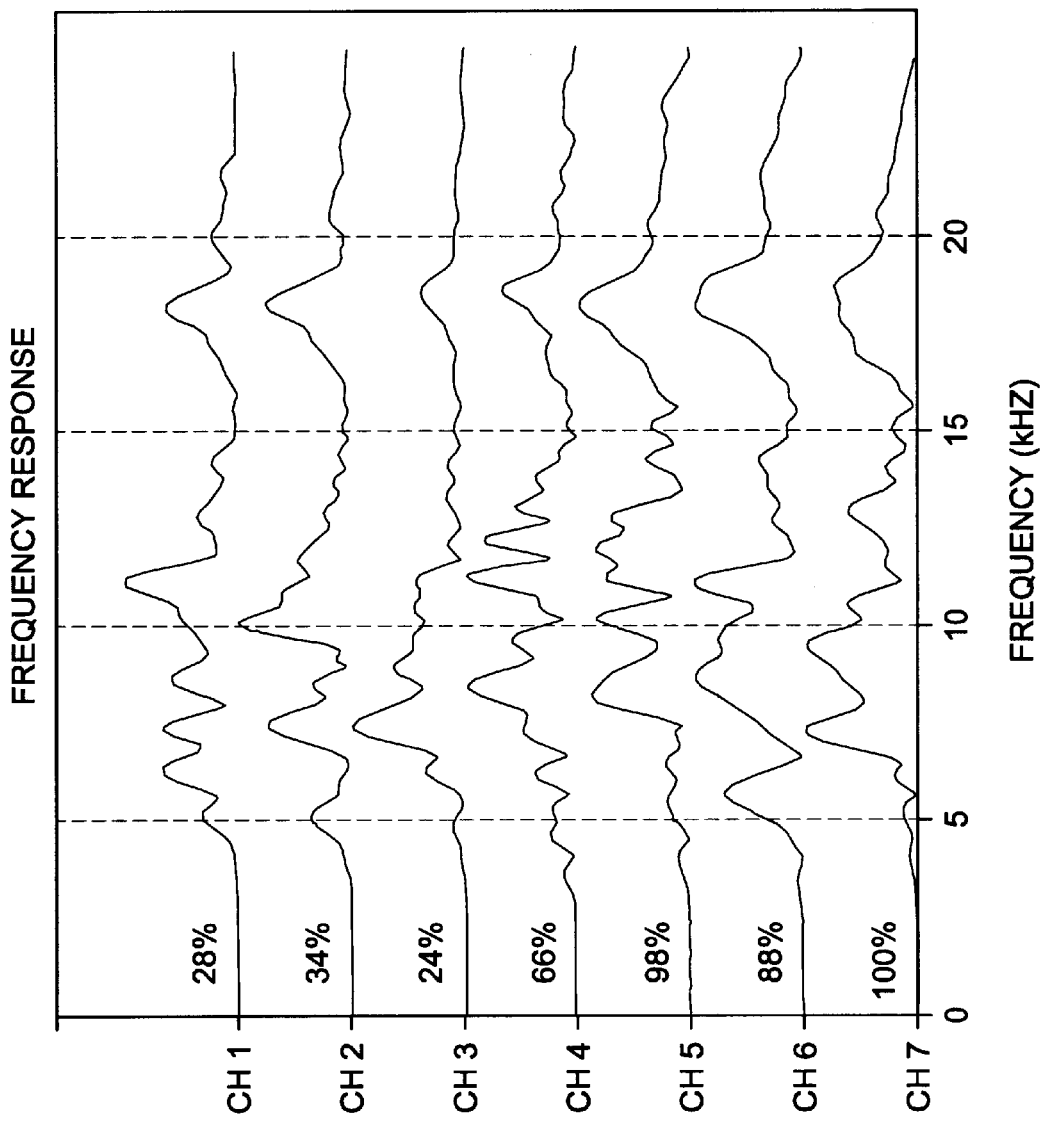
FIG. 2D is the frequency response for the seven channels shown in FIG. 2A.
Figure 2E:
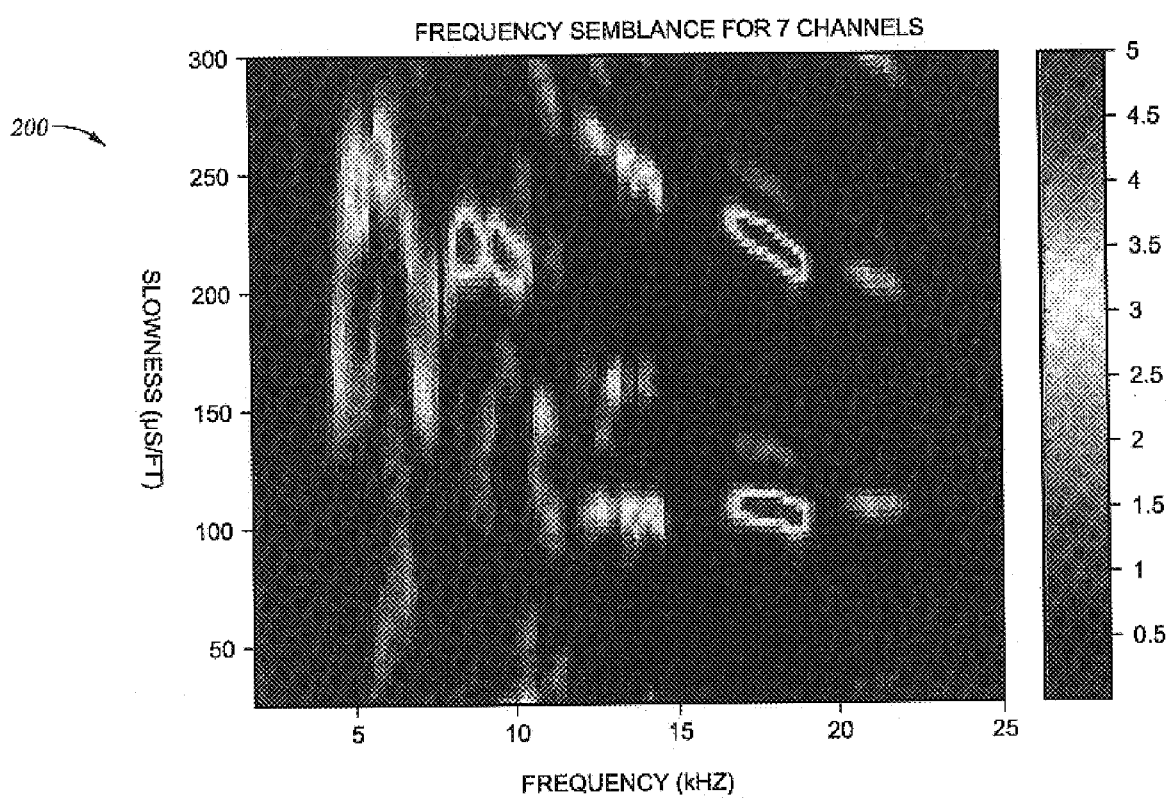
FIG. 2E is a frequency semblance corresponding to the time domain semblance of FIG. 2B.
Figure 2F:
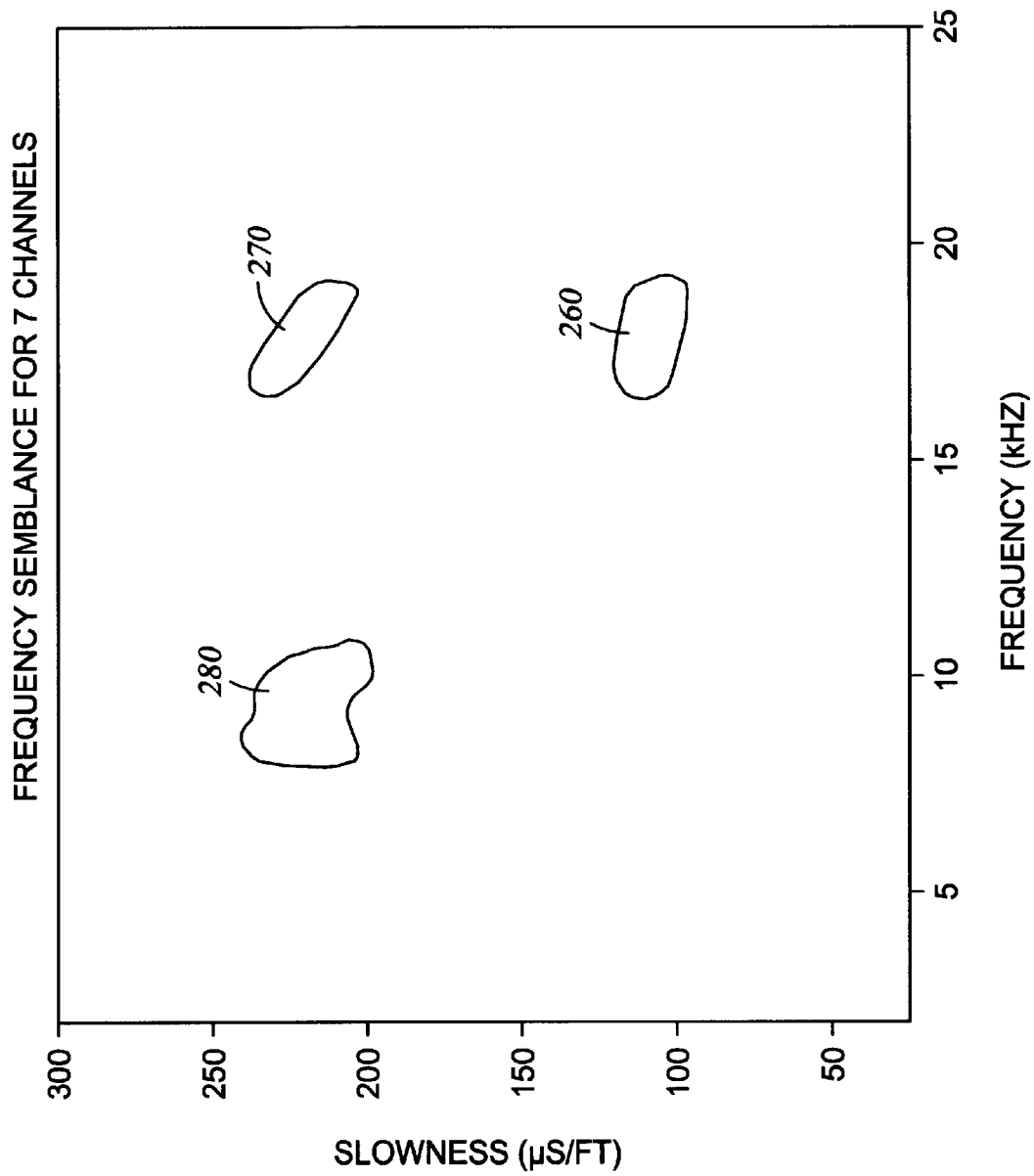
FIG. 2F is an outline view of FIG. 2E.

Referring to FIG. 2E, the frequency semblance corresponding to FIG. 2B is shown. FIG. 2F is an outline trace of FIG. 2E. Referring to FIGS. 2E and 2F, there are three notable peaks of high semblance value. A first peak 260 is at about 100 microseconds per foot at a frequency of somewhere between 15 and 20 kilohertz. A second peak is present at about the same frequency as the first peak, but has a slowness of about 225 microseconds per foot. This second peak 270 is at about the same frequency as the first peak 260, but is distinctly angled from horizontal. A third peak 280 also exists at about 225 microseconds per foot but at a lower frequency somewhere between 5 and 10 kilohertz.

FIGS. 2E and 2F can be used to identify an alias or shadow in FIG. 2B. In particular, the second peak 270 in FIG. 2D is a shadow of the first peak 260. This is apparent because of the slope or angle of the second peak 270 as compared to the first peak 260 that has little or no slope. To assist in determining exactly which peak this corresponds to in the time semblance of FIG. 2B, for example a band stop filter may be applied to the time domain semblance to filter out the shadow peak on the time domain semblance. Thus, peak 220 on FIGS. 2B and 2C can be identified as a shadow or alias.

Figure 2G:
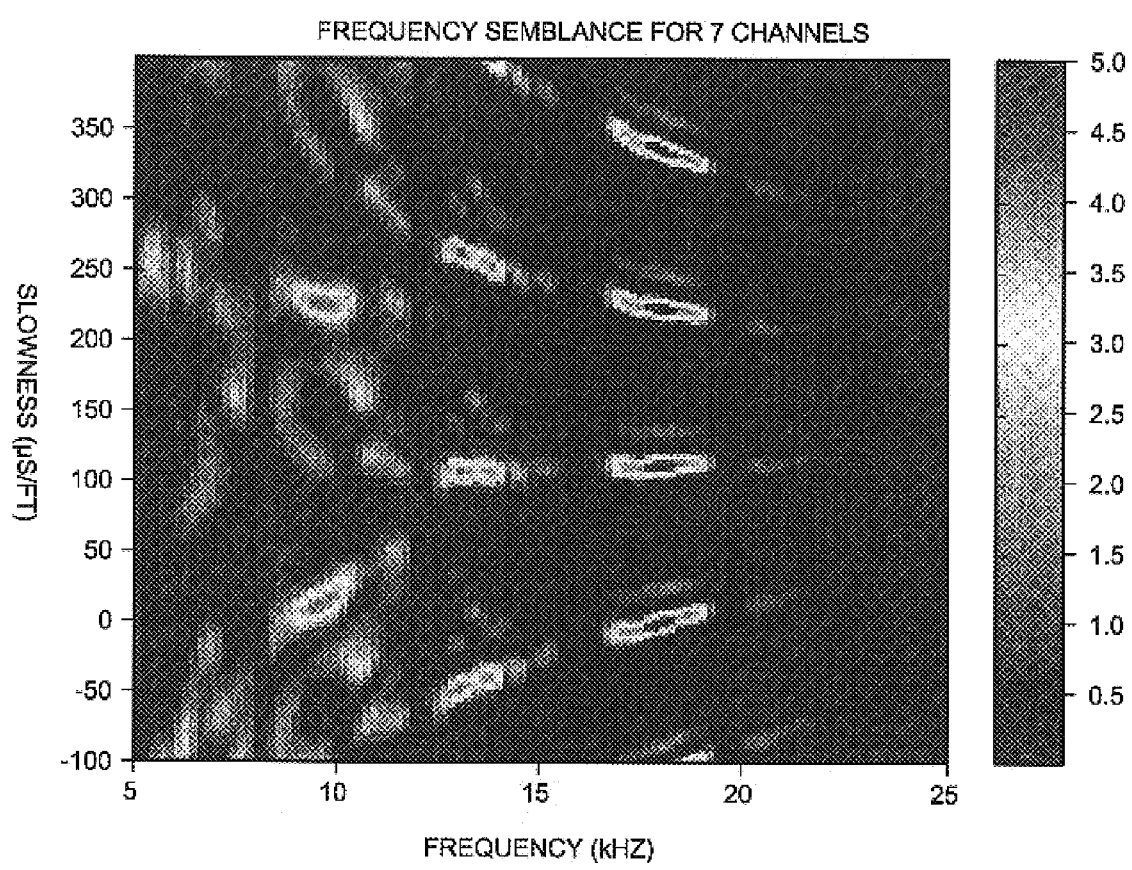
FIG. 2G is a frequency semblance corresponding to that shown in FIG. 2E but over a broader range of frequencies.

The angled slope of aliases in the frequency semblance has additional advantages. FIG. 2G is a frequency semblance corresponding to about the same depth as FIG. 2B, but displays a broader range of frequencies. Looking at the broader range of frequencies of FIG. 2G, it can be seen that the slope of the aliases results in a number of angled peaks that point at the true or actual peak.

In addition, the third peak 280 on FIGS. 2E and 2F is of interest. The frequency of a peak tends to indicate how the wave propagated, and thus what type of wave it is. For example, compressional waves tend to have a higher frequency, shear waves tend to have lower frequencies, and Stonely waves tend to have even lower frequencies. Therefore, the low frequency of peak 280 tends to indicate that it is not a compressional wave. Moreover, the shape of the third peak on FIG. 2D indicates that it corresponds to a shear wave. In particular, shear wave peaks tend to droop or bend down from lower to higher frequencies (left to right in the figure). Other shapes may also correspond to a particular type of wave or other characteristic. Consequently, the shape of the peaks in a frequency semblance can also be of interest. Of course, although a color-coded frequency semblance graph is helpful because it visually and dramatically illustrates the characteristics of the received acoustic waveform, these frequency identifications described herein can also be made directly to the observed data without the need to construct a frequency semblance, such as by an automated peak picker that determine the frequency and slowness value for maximum semblance, as well as extent and geometric shape of the areas of high semblance values.

Figure 6A:
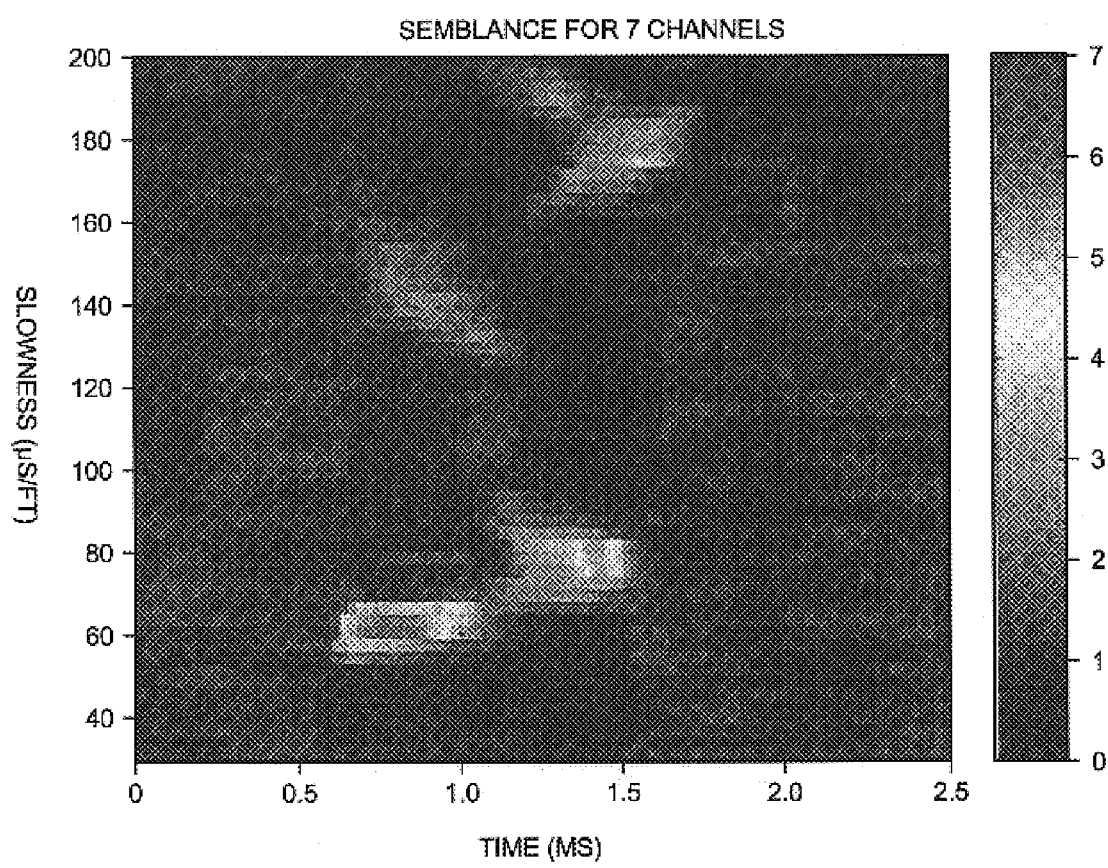
FIG. 6A is a time semblance for a set of data.
Figure 6B:
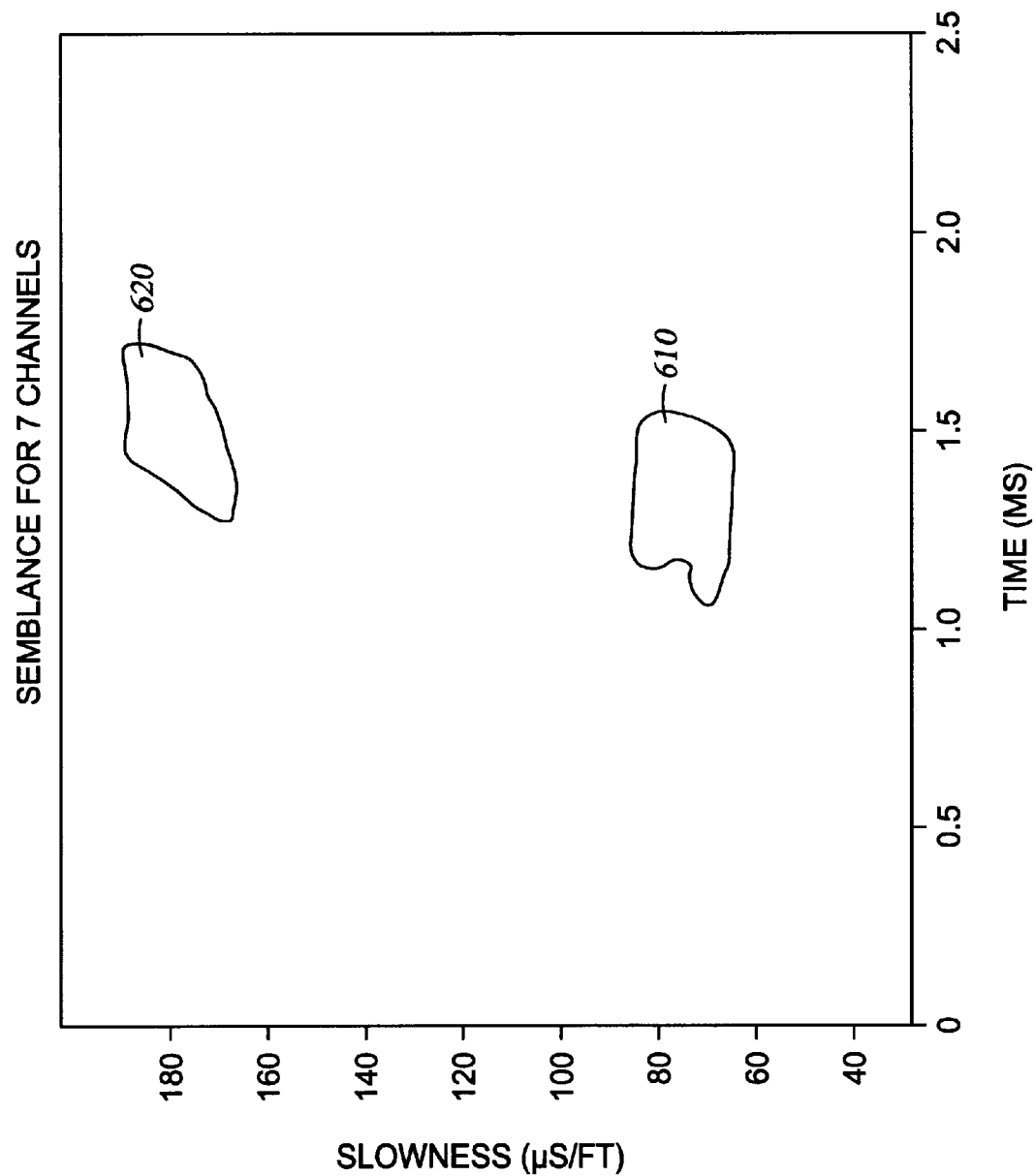
FIG. 6B is an outline view of FIG. 6A.
Figure 6C:
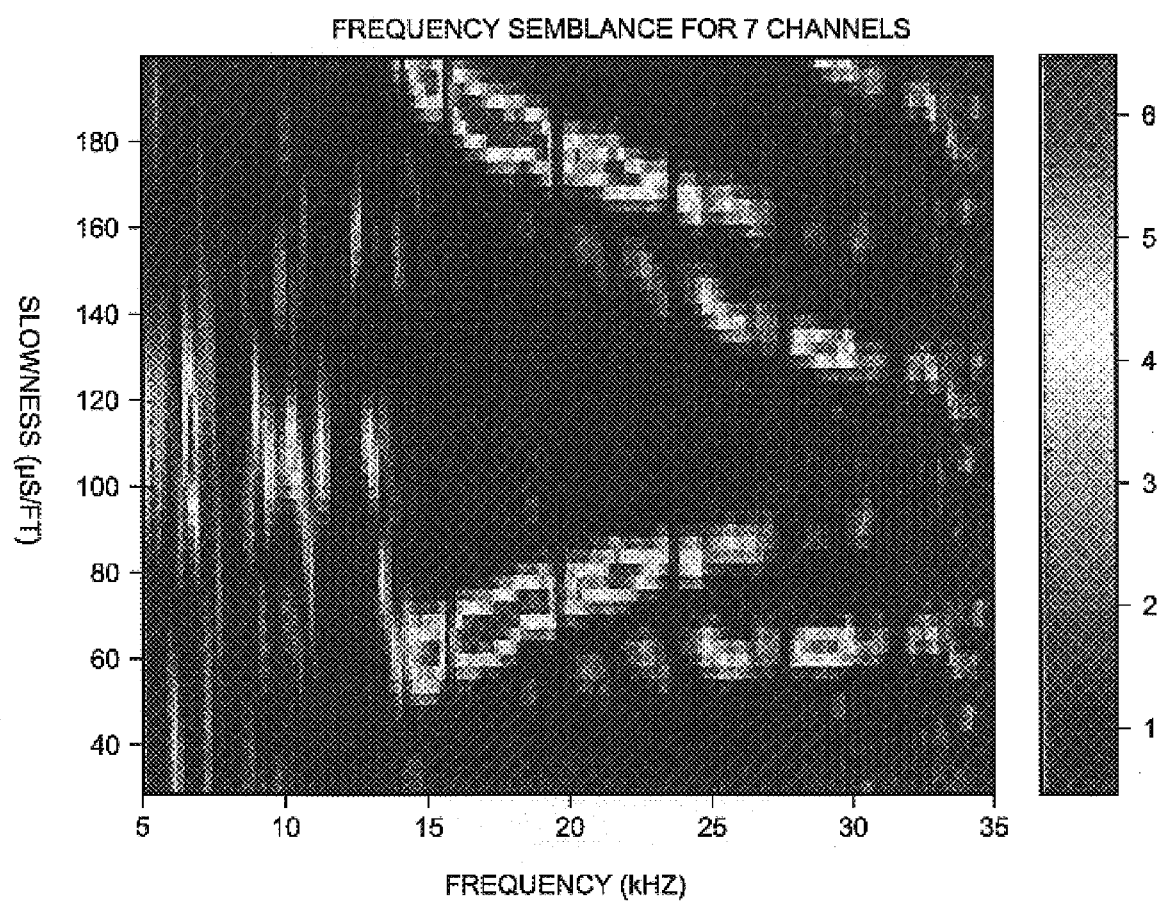
FIG. 6C is a frequency semblance for the set of data of FIG. 6A.
Figure 6D:
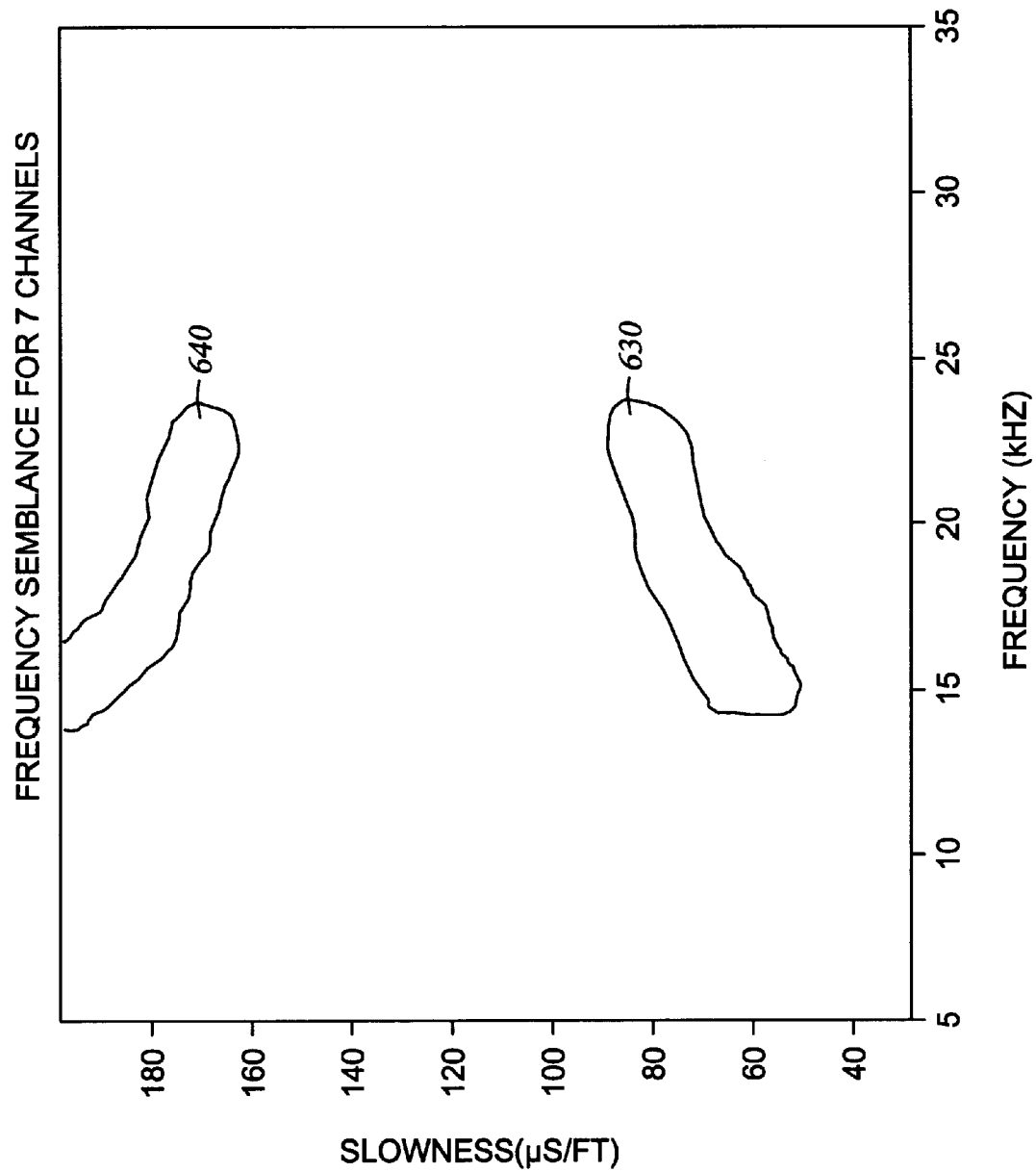
FIG. 6D is an outline view of FIG. 6C.

Another problem that is solved by a frequency domain semblance is not knowing whether a diffuse peak is due to dispersion of the acoustic signal in a rock formation or due to tool error. A frequency domain semblance resolves this ambiguity because on the frequency domain semblance a received waveform in a dispersive formation has a signature shape. In particular, as shown in FIGS. 6A–6F, a peak from a wave that traveled through a dispersive formation can be spread out along the frequency axis. FIGS. 6A and 6B depict a time semblance for a particular set of data, including a first peak 610 and a second peak 620. FIGS. 6C and 6D are the corresponding frequency semblance including peaks 630 and 640. Peak 630 is the "real" or "actual" peak, whereas peak 640 is merely an alias or shadow.

As can be seen by reference to these Figures, the spread-out shape of the "real" peak 630 in the frequency semblance tends upward at higher frequencies when the acoustic signal has dispersed through a rock formation. This indicates to an operator that the smeared peak present in a time domain sequence is not due to tool error, but instead is due to dispersion of the acoustic signal into the rock formation.

Figure 6E:
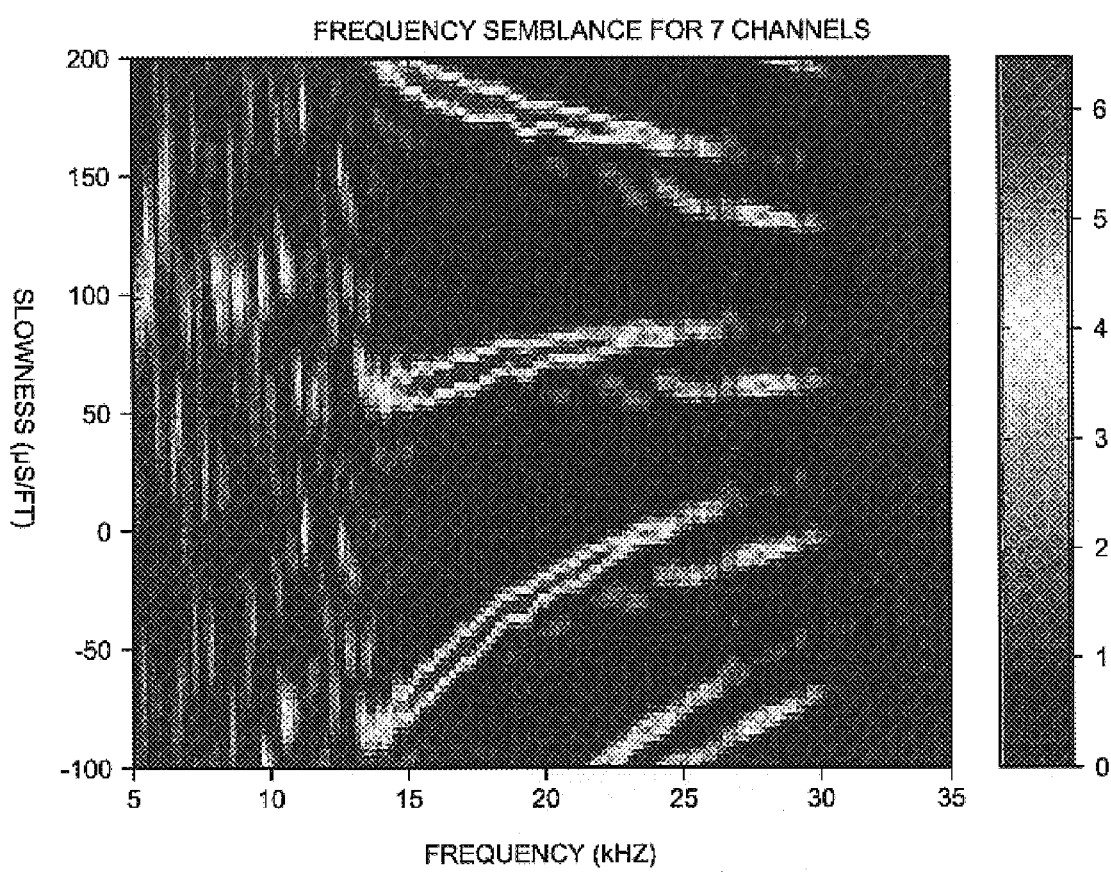
FIG. 6E is the frequency semblance of FIG. 6C over a broader range of slowness values.
Figure 6F:
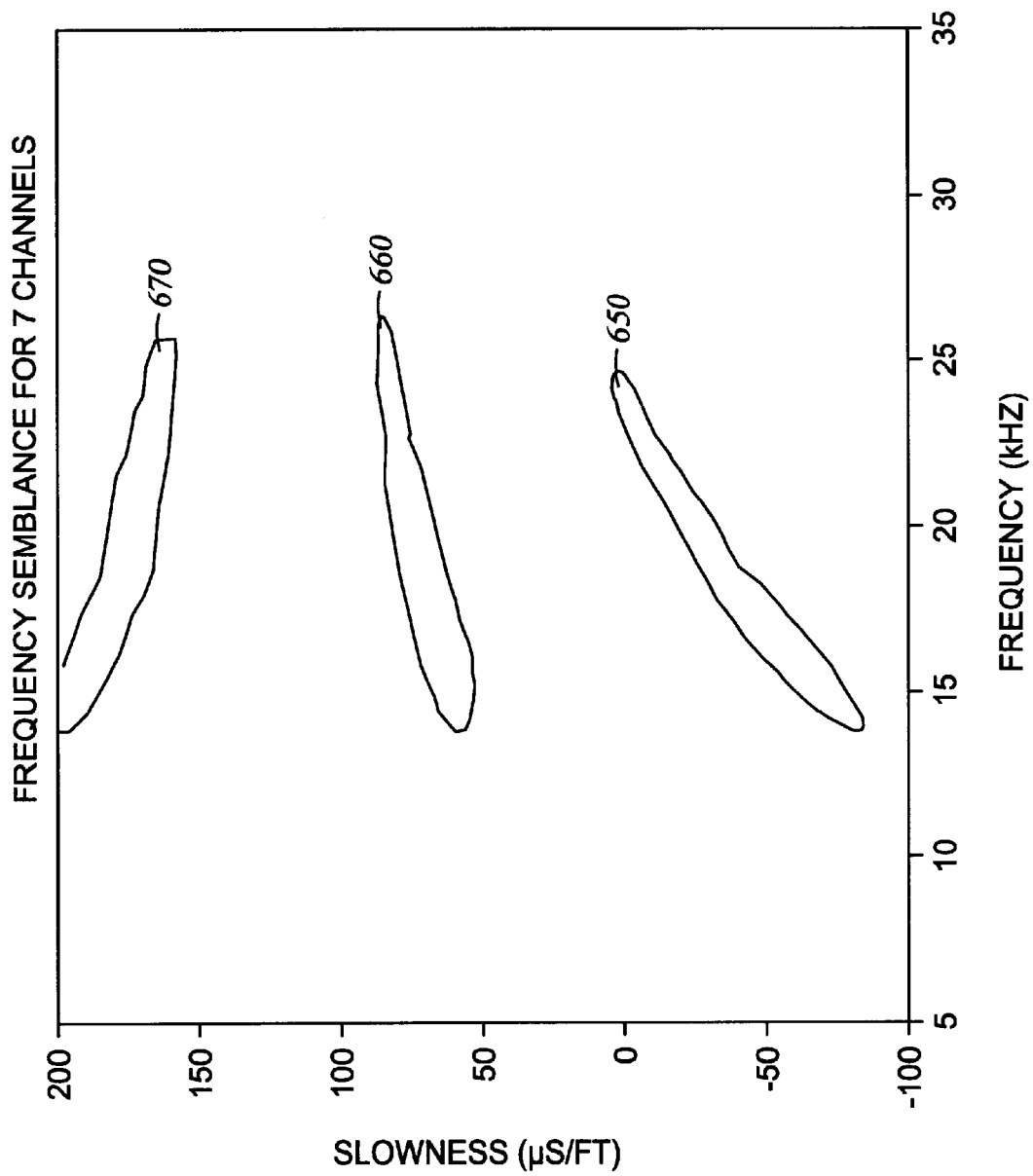
FIG. 6F is an outline view of FIG. 6E.
Figure 7:
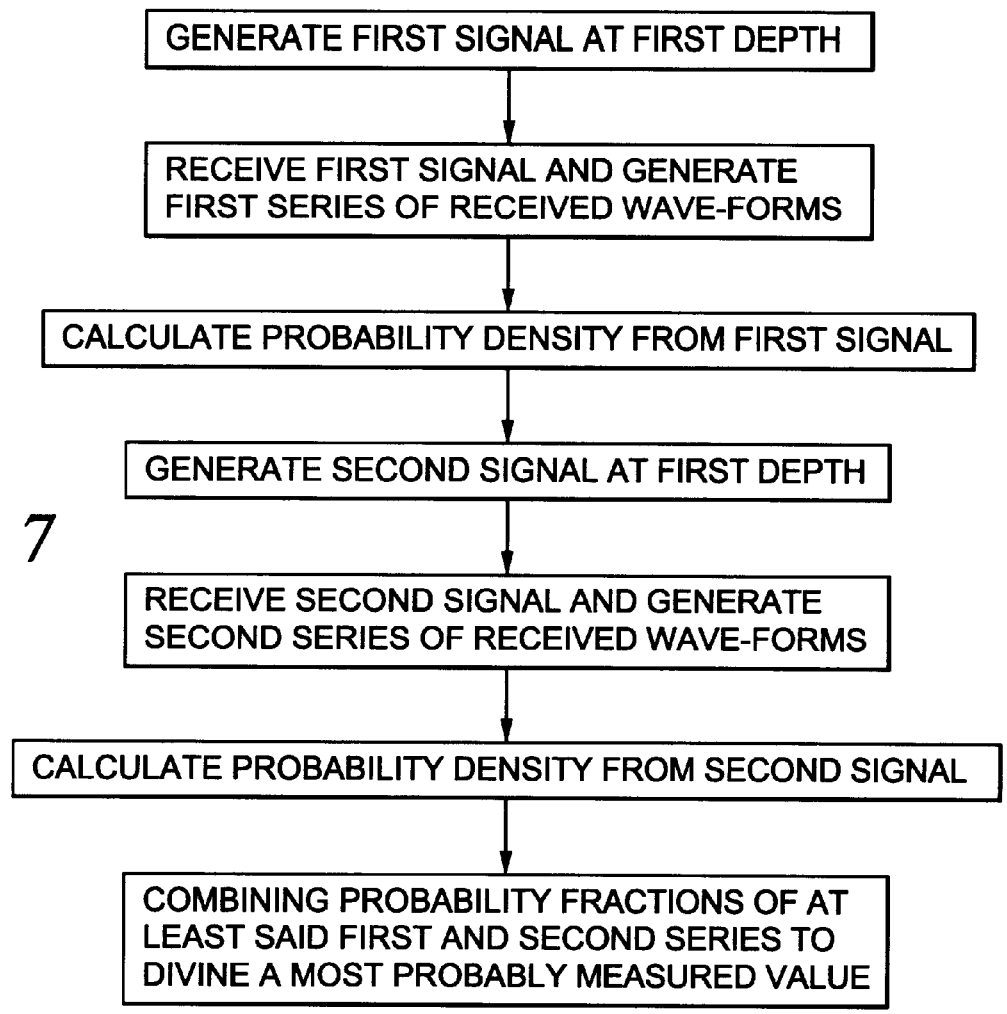
FIG. 7 is as flow diagram of a first method according to the invention to derive a most likely measured valve
Figure 8:
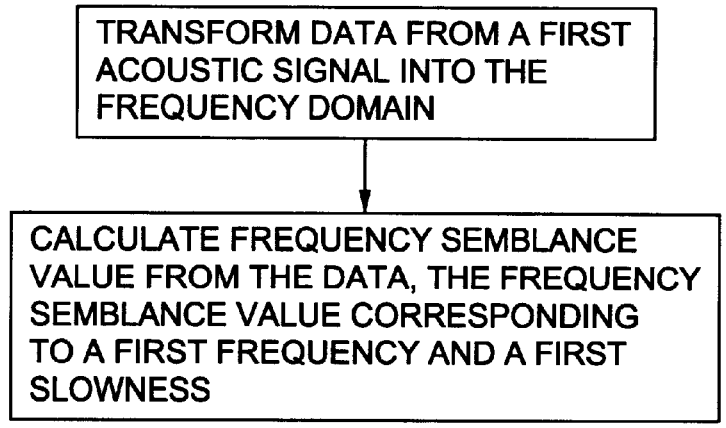
FIG. 8 is a flow diagram of a second method according to the invention based on transforming acoustic data into the frequency domain.

FIGS. 6E and 6F are frequency semblances for the same data, but over a larger range of slownesses. These Figures include peaks 650, 660, and 670. It can be seen that peak 630 at a slowness of around 60–100 microseconds/foot is the "real" peak, and not an alias, because of the way peaks 650 and 670 "point" toward peak 660, which is also at a slowness of around 60–100 microseconds/foot. Thus, peak 660 corresponds to peak 630 and consequently both of peaks 660 and 630 are the "real" peak. Using frequency semblances, as shown above, it is possible to determine the dispersive nature of a formation. As with time domain sequences, a log or other correlation of depth and slowness may be created. This in turn helps to infer the actual lithology of the formation. This is another strength that frequency semblance brings to sonic tool data processing.

Figure 4A:
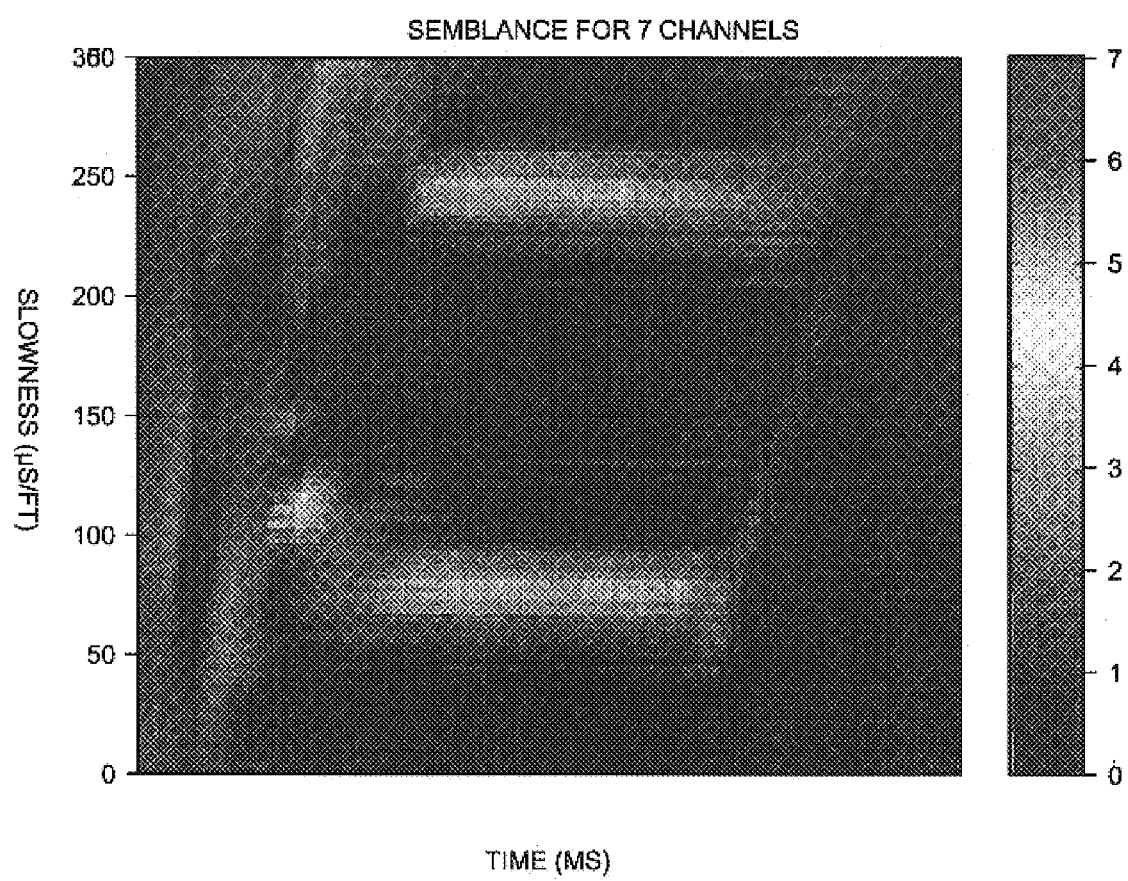
FIG. 4A is a first frequency domain semblance.
Figure 4B:
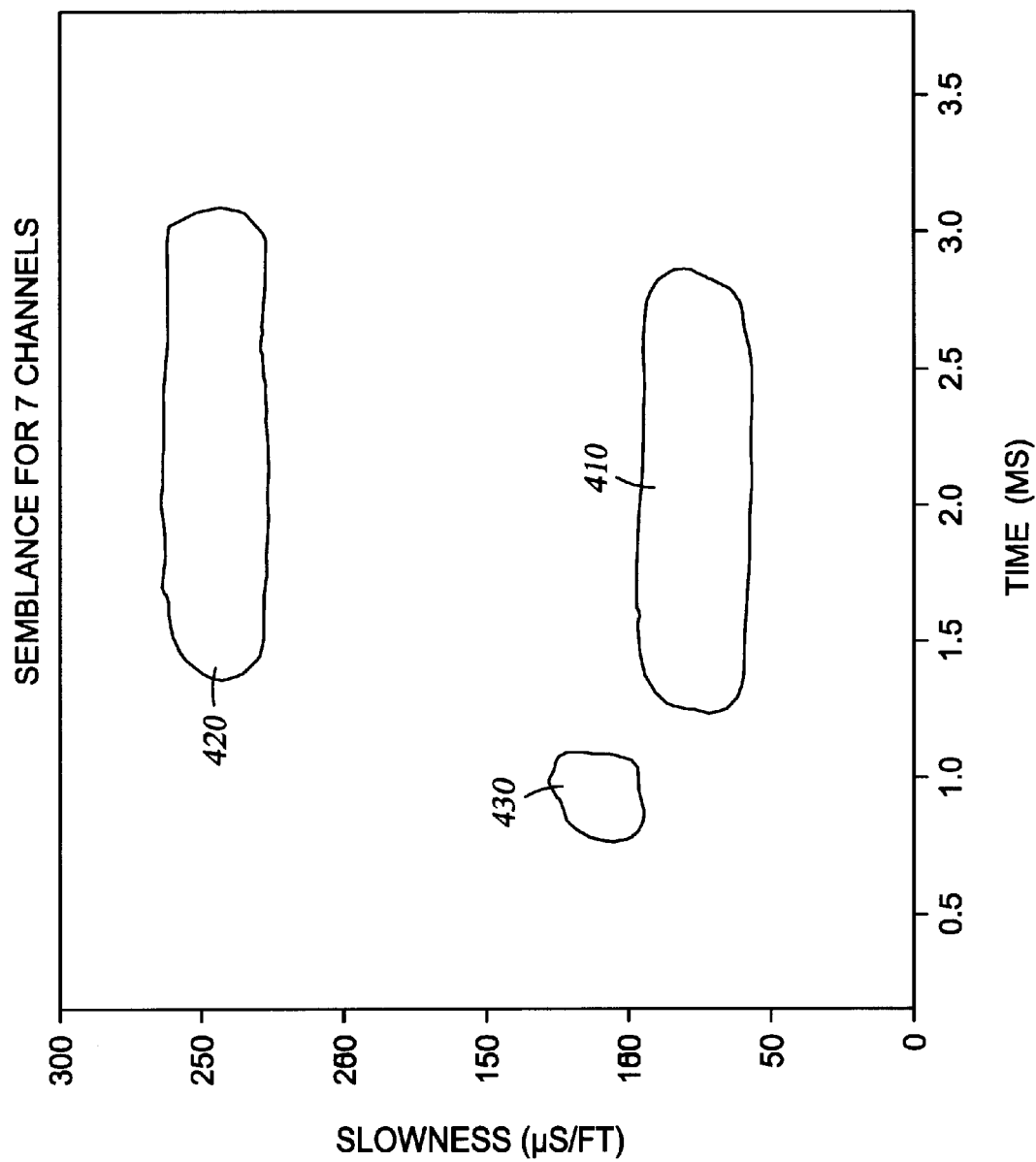
FIG. 4B is an outline view of FIG. 4A.
Figure 4C:
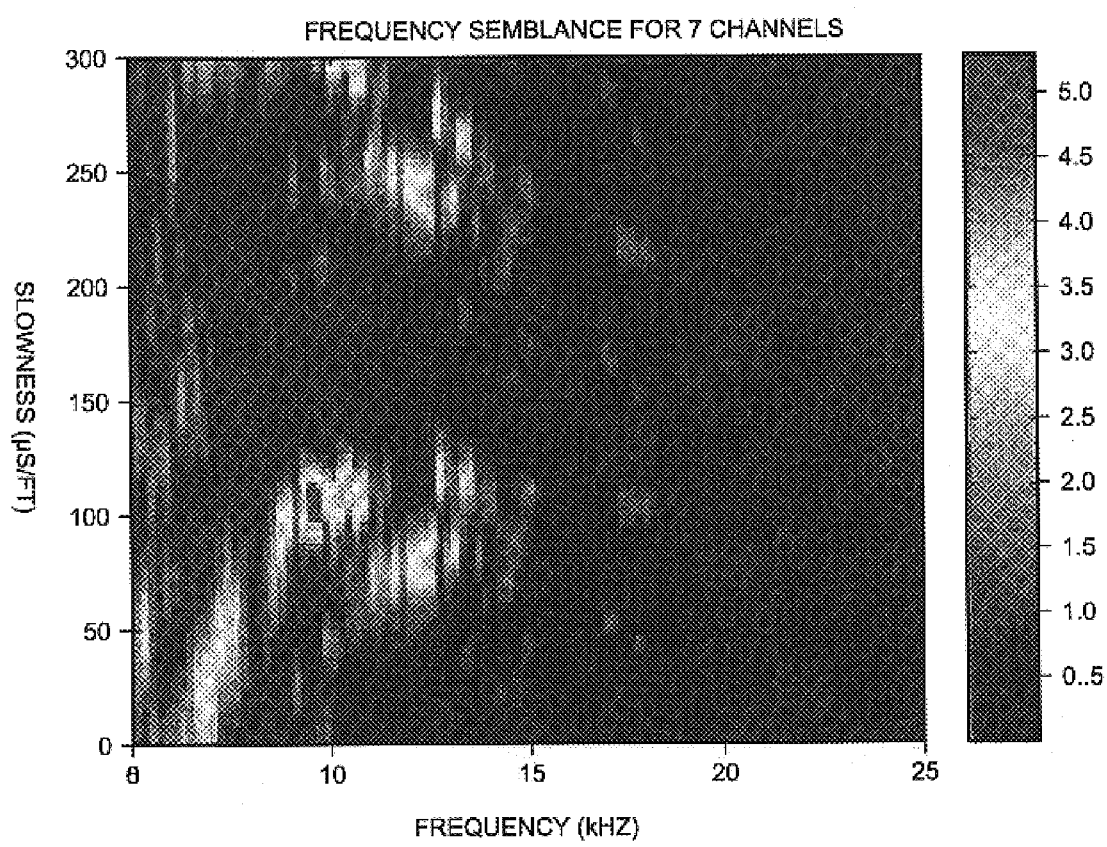
FIG. 4C is a second frequency domain semblance.
Figure 4D:
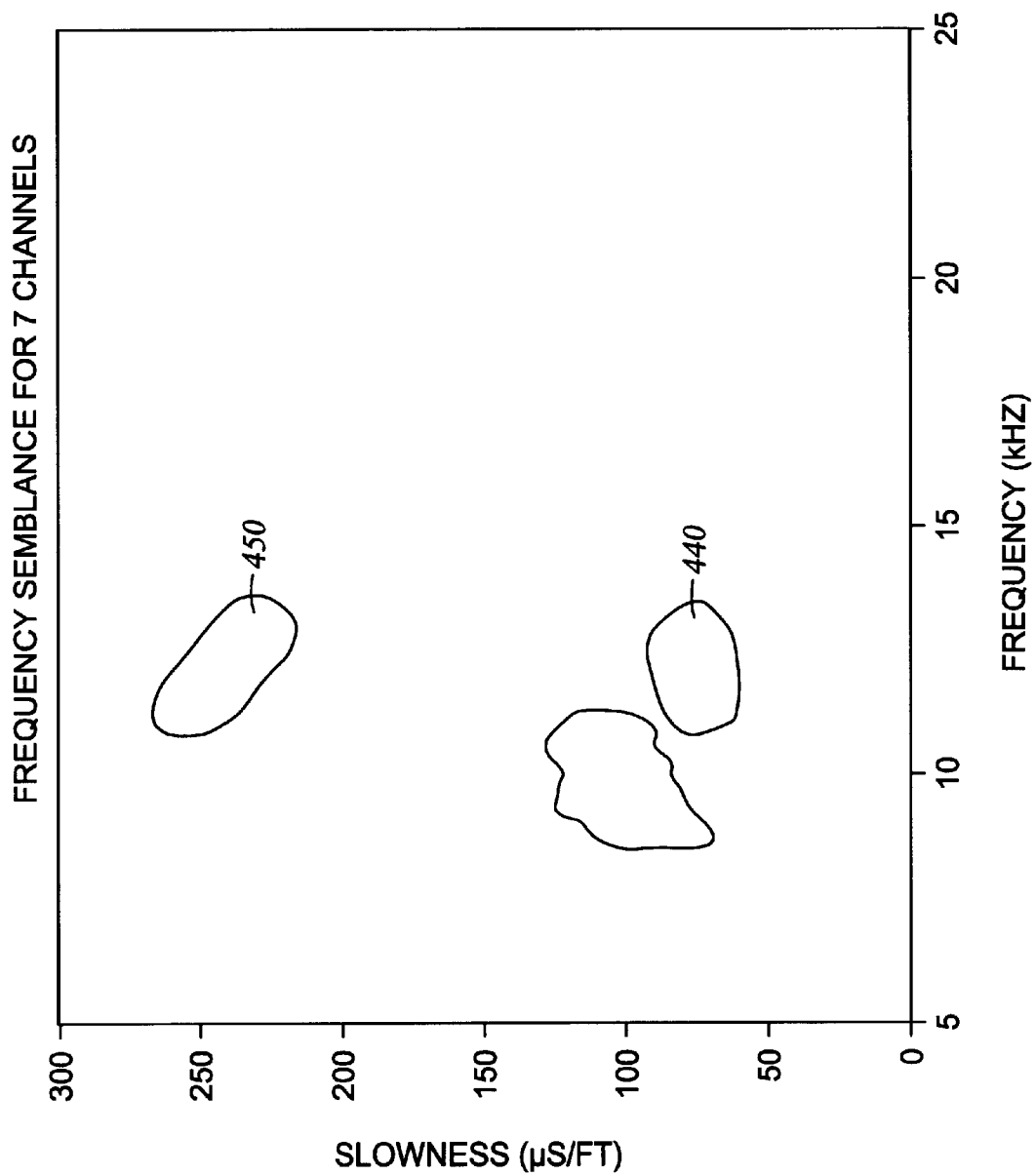
FIG. 4D is an outline view of FIG. 4C.
Figure 4E:
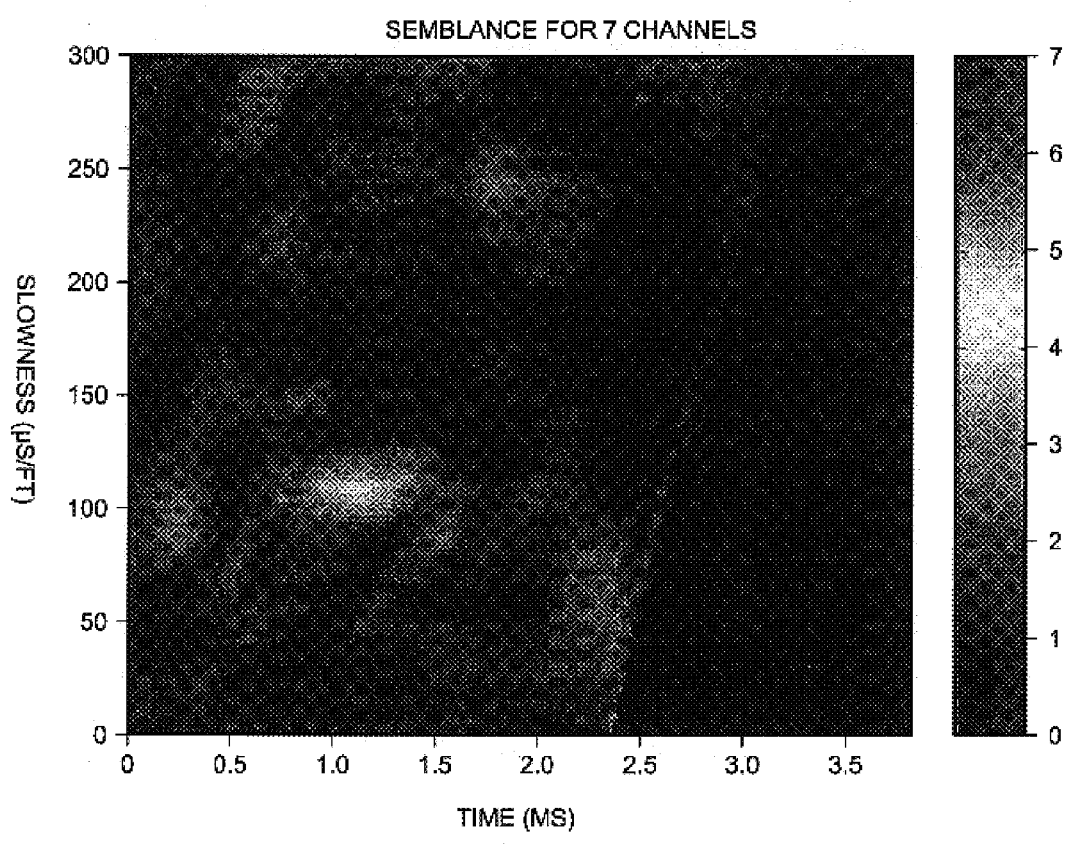
FIG. 4E is a third frequency domain semblance.

The frequency domain semblance also has another advantage. As stated above, a frequency filter may be applied to the waveforms that make up the time domain semblance to remove a shadow or alias. For example, FIGS. 4A and 4B represent a time domain semblance for a particular set of received waveforms. Labeled in FIG. 4B is a first peak 410, a second peak 420, and a third peak 430. FIGS. 4C and 4D are the corresponding frequency domain semblance. Included in FIG. 4D are peaks 440 and 450. As can be seen by the slope of peak 450, second peak 420 in FIG. 4A is a shadow of first peak 410. When a frequency filter is applied to the time domain semblance shown in FIG. 4A, it results in the time domain semblance of FIG. 4E. As can be seen, the peak corresponding to third peak 430 is now stronger and more easily identified because of the noise that was removed by use of the frequency filter. In addition, FIG. 4E does not include the diffuse peak 410 because this shape and slowness of peak has been filtered out as a known consequence of resonating the tool body with an acoustic transmitter.

The data displayed in a frequency domain semblance can be created by the following mathematical formula:

$$FS(\omega, s) = \frac{\left|\sum_j F(f_j(t))e^{-idjs}\right|^2}{\sum_j |F(f_j(t))e^{-idjs}|^2}$$

Where,

F(x)=Fourier transform;

$f_j(t)$=time series values for a particular receiver or channel j;

d=distance from a constant point (usually the location of the transmitter);

j=receiver or channel number;

s=slowness, and

ω=frequency.

Thus, for any desired frequency and slowness, a frequency semblance value (FS) may be derived.

As can be appreciated by one of ordinary skill in the art upon review of this equation, the wave forms from the receivers on the sonic logging tool are transformed by use of a Fourier transform into the frequency domain to derive $f_j(t)$. This results in frequency waveforms as can be seen in FIG. 2C. The data from each different channel (i.e. receivers), $f_j(t)$, are multiplied by a phase factor $e^{-idjs}$ that corresponds to the different formation slowness (velocity) with which the signal propagated through the formation. The phase factors are determined according to the above equation.

The signals from each channel are summed for every frequency and slowness that are of interest. The absolute value is taken of the sum corresponding to one frequency and one slowness. This sum is then squared. Alternatively, the squared value may be found by multiplying the Fourier sums with its conjugate. Either way, this squared value is then divided by the sum of the squared absolute value for which the semblance has been computed, as shown in the equation. If the phase of the signals from the different channels at a certain frequency coincide for a certain slowness phase factor, the value of the frequency semblance will be large and indicate the phase velocity of the signal at the analyzed frequency.

The invention also encompasses a self-adaptable data compression method for acoustic data. The invention selects an optimum compression technique from a series of available compression techniques to minimize the amount of data required to be stored or transmitted.

Figure 5:
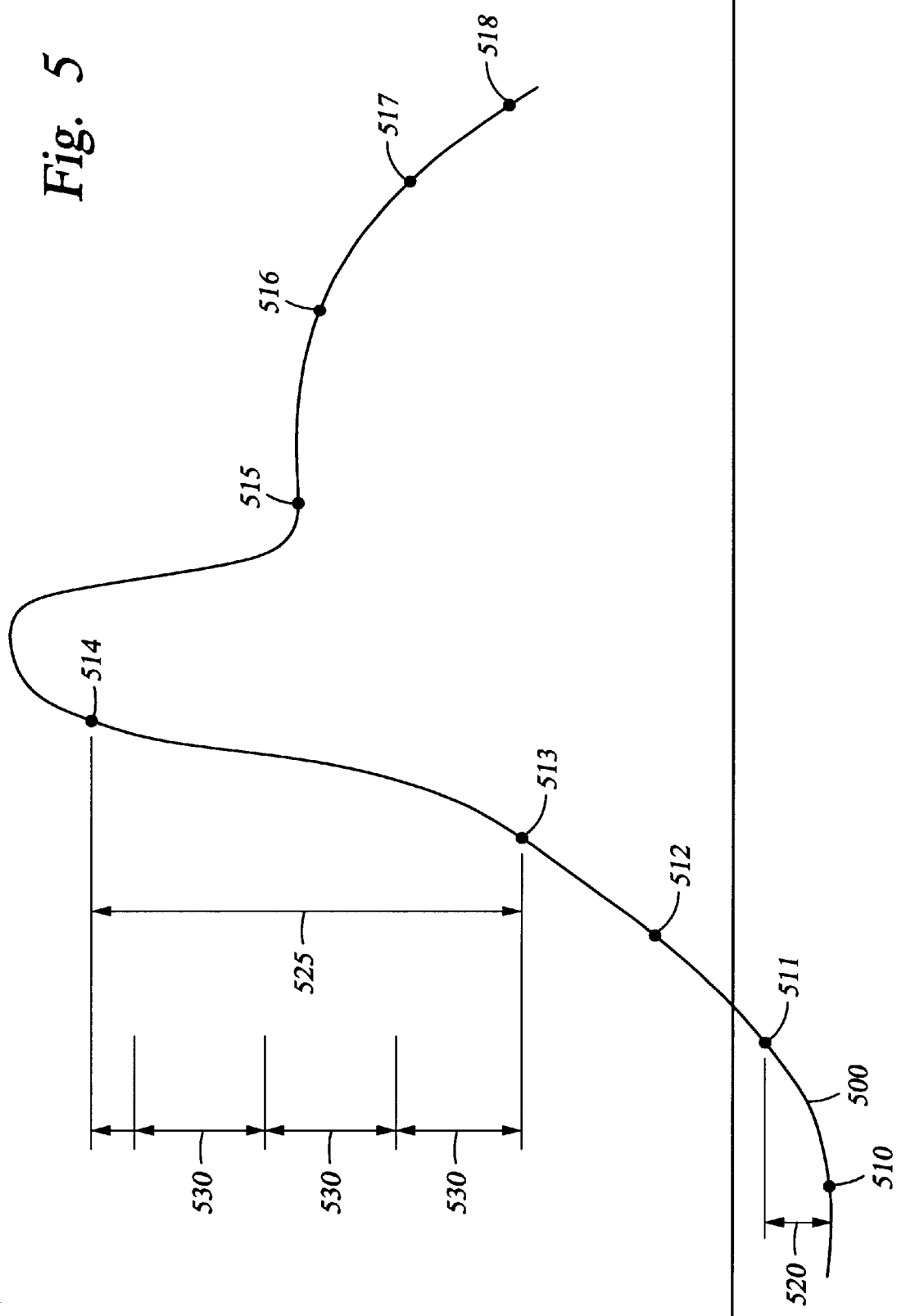
FIG. 5 is an analog waveform illustrating a self-adaptable compression technique.

FIG. 5 shows an analog waveform 500, and a number of sample points 510–518 corresponding to the digitization of the waveform. For example, when digitized a signal may be sampled 10 times per wavelength. As can be seen each consecutive sample point 510–518 has a step difference 520 from the previous sample point.

It is not necessary to save the actual value of every sample point 510–518. While the actual value of the first point 510 must be saved, the value of the second point 511 may be stored as the magnitude of step difference 520 from the first point 510. Similarly, the value of the third point 512 may be stored as the magnitude of the difference from the second sample point 511. Thus, the waveform may be stored as a series of numbers (bits), with the actual value of the first sample point being recorded, and followed by the step difference for each consecutive sample point. In computer readable form, a bit series of a predetermined number of bits is assigned to record each step difference.

The difference between certain sample points, such as points 513 and 514, may be too great to be recorded by the number of bits assigned to each step difference (i.e., the bit series). The magnitude of this difference is labeled 525 in FIG. 5, and the maximum difference recordable by the predetermined number of bits dedicated to each step difference is labeled as 530. In such an instance, an upshift or downshift may be inserted in the data to represent the upshift or downshift. For example, for a 4-bit step size an upshift may be defined as 1111 and a downshift by 0000. Consequently, because the upshift and downshift steps occupy two of the $2^n$ possible combinations, a difference amount of $(2^n-2)$ is the largest difference step 530 that can be represented by the n-bit series.

This $2^n-2$ size difference step can be recorded according to various protocols. For example, the middle (or any other defined bit sequence) of the bit series may correspond to a difference step of zero, with a bit series such as 0001 being a down step and 1110 being an up step. Alternatively, a particular bit pattern may indicate a step direction change, with all the consecutive step differences being in the same direction (until the "change step direction" bit pattern is once again encountered). The size of the difference step in this instance would of course be $2^n-2$. This general encoding formula may be referred to as a bit encoding protocol. Other storage protocols are within the skill of the ordinary artisan. Depending on the particular waveform being compressed, and other factors, one or the other of these may be more efficient.

Another difficulty is determining the ideal number of bits to dedicate for each step difference. If too many bits are dedicated to define the size of a step, so that for example the step difference between sample points 513 and 514 can be recorded with only one bit series, then often other step differences along the waveform do not utilize all the bits in the bit series. Thus, bits go unused and memory is wasted. If too few bits are dedicated to define the size of a step, then insertion of an upshift or downshift in the data sequence will be common and this will result in a less efficient than ideal compression. This problem is particularly thorny in the context of acoustic wave receivers spaced a range of distances away from an acoustic transmitter because the waveforms from the more distant receivers tend to have smaller amplitudes, and therefore smaller step differences than the waveforms from the closer receivers. Thus, the ideal compression size may change depending on the receiver (and waveform) at issue.

The solution to this dilemma lies in self-adaptation. Before being stored, the amount of data needed by each waveform for storage is computed by a micro-processor or the like based on a range of possible bit values and storage protocols. For example, the amount of memory required to store a received waveform may be determined for a 3-bit difference storage scheme, a 4-bit difference storage scheme, a 5-bit difference storage scheme, etc. up until a 12-bit storage scheme. Of course, the range of bit sizes may be smaller or greater depending on the circumstances. The amount of memory required to store a-received waveform may also be determined based on the middle of the bit series corresponding to a bit step of zero, in addition to being computed according to various other methodology, including those described above. The microprocessor then selects the step bit size that will ultimately use the fewest number of bits after compression. Afterwards, the microprocessor compresses the waveform according to that step bit size. Further, there is no need to run actual compression if the microprocessor determines that even the best compression does not save any memory.

Those skilled in the art will recognize that many variations on this theme exist. For example, compression is not limited simply to the difference between consecutive sample points on a waveform. The difference of the differences may also be used, or the difference of the differences of the differences, etc. In formula, this may be expressed as:

$$d(n)=s(n+1)-s(n);$$

$$d(n+1)=s(n+2)-s(n+1);$$

$$dd(n)=d(n+1)-d(n);$$

$$dd(n+1)=d(n+2)-d(n+1);$$

$$ddd(n)=dd(n+1)-dd(n);$$

Where, s(n)=the waveform signal at location n d(n)=the difference of consecutive sample points dd(n)=the difference of consecutive differences, etc.

If the difference of the differences is utilized, then the value of the first difference should be stored in addition to the value of the first point in the waveform. This logic then continues if the difference of the differences of the differences is used, etc. Some or each of these difference of the differences approaches, and other techniques to compress data, can be employed by the downhole microprocessor to self-adapt and establish the ideal compression for any particular waveform. Once the waveform has been compressed, it may be stored or transmitted to the surface.

After the compression and storage of the data, a downhole processor or processors may also start to analyze the data.

Because drilling continues for long periods of time, a substantial amount of analysis may be completed downhole. This allows the downhole processor to determine the characteristics of the waveforms. In particular, the processing can begin the evaluation of semblance maps for peaks, including their location, the semblance or intensity value, the shape of the peak, and the energy of the peak. Thus, a large portion of the time required to establish these parameters is eliminated from uphole analysis. On the other hand, the invention does not attempt to identify the wave types or other characteristics of the waveforms until the data has been brought uphole. This avoids many of the errors associated with previous attempts at downhole waveform analysis.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention.

What is claimed is:

1. A frequency domain semblances method comprising:
   (a) transforming data from a first acoustic signal into the frequency domain;
   (b) calculating a frequency semblance value from said data, said frequency semblance value corresponding to a first frequency and a first slowness for said data.

2. The frequency domain method of claim 1, wherein said transforming step further includes transforming second data from a second acoustic signal into the frequency domain, and wherein said frequency semblance value is additionally calculated from said second data.

3. The method of claim 1, further comprising:
   (c) graphically displaying a set of said frequency semblance values.

4. The method of claim 1, further comprising:
   (d) generating a set of said frequency semblance values.

5. The method of claim 4, further comprising:
   (e) applying a frequency filter to said data, said frequency filter corresponding to one or more ranges of frequencies, and wherein said frequency filter eliminates portions of said data that correspond to said ranges of frequencies.

6. The method of claim 5, wherein said one or more ranges of frequencies are selected based upon predetermined patterns in said set of frequency semblance values.

7. The method of claim 1, wherein a set of frequency semblance values are calculated, said set of frequency semblance values including at least one maximum semblance value, said maximum semblance value corresponding to a first peak frequency, a first peak slowness, and an energy value.

8. The method of claim 7, wherein said at least one maximum semblance value corresponds to a set of high frequency semblance values, said set of high frequency semblance values corresponding to a characteristic of said first acoustic signal.

9. The frequency domain method of claim 1, wherein said first acoustic signal is received at a plurality of depths in a borehole, said transforming step further including the transformation of data from each of said plurality of depths in said borehole for calculation of said semblance value.

10. The frequency domain method of claim 9, wherein said set of frequency semblance values are calculated downhole in a borehole.

11. The frequency domain method of claim 9, wherein said set of frequency semblance values are calculated at an above surface location.

12. The frequency domain method of claim 9, wherein a set of frequency semblance values are calculated and said set of frequency semblance values correspond to a first peak frequency, a first peak slowness, a peak energy value, and a peak shape.

13. The frequency domain method of claim 12, wherein said first peak frequency, said first peak slowness, and said peak energy value are calculated by a downhole processor in a wellbore.

14. The frequency domain method of claim 13, wherein at least one of said first peak frequency, first peak slowness, peak energy value, and peak shape are calculated at a sub-surface location to yield a calculated value, said at least one calculated value being stored downhole, said method further comprising calculating at least a second calculated value at an above ground location.

15. A frequency domain semblances method comprising:
   (a) generating a first acoustic signal at a first depth in a borehole;
   (b) receiving said first acoustic signal at a first set of acoustic receivers proximate said first depth to generate a first series of received acoustic waveforms;
   (c) transforming said first series of received acoustic waveforms into the frequency domain;
   (d) calculating a first frequency semblance value from said data, said frequency semblance value corresponding to a first frequency and a first slowness for said data;
   (e) generating a second acoustic signal at a second depth in said borehole;
   (f) receiving said second acoustic signal at a second set of acoustic receivers proximate said second depth to generate a second series of received acoustic waveforms;
   (g) transforming said second series of received acoustic waveforms into the frequency domain;
   (h) calculating a second frequency semblance value from said data, said second frequency semblance value corresponding to a second frequency and a second slowness for said data;
   (i) correlating said first slowness and said second slowness with said first depth and said second depth.

16. The method of claim 15, wherein said correlating step yields a slowness-depth log of said borehole.

17. A method to combine time domain semblances, comprising:
   (a) calculating from a first plurality of waveforms a first set of time domain semblance values corresponding to a first depth in a borehole, each of said time domain semblance values in said first set corresponding to a time and a slowness;
   (b) calculating from a second plurality of waveforms a second set of time domain semblance values corresponding to said first depth in a borehole, each of said time domain semblance values in said second set corresponding to a time and a slowness;
   (c) combining a first time domain semblance value from said first set and a second time domain semblance value from said second set, said first time domain semblance value and said second time domain semblance value corresponding to the same time and slowness.

18. The method of claim 17, wherein said combining step is multiplication.

* * * * *